US008855043B2

(12) United States Patent
Morioka et al.

(10) Patent No.: US 8,855,043 B2
(45) Date of Patent: Oct. 7, 2014

(54) RELAY NODE AND RECONNECTION METHOD

(75) Inventors: Yasufumi Morioka, Tokyo (JP); Akira Yamada, Tokyo (JP); Hideaki Takahashi, Tokyo (JP); Mikio Iwamura, Tokyo (JP); Junichiro Hagiwara, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/878,741

(22) PCT Filed: Oct. 31, 2011

(86) PCT No.: PCT/JP2011/075119
§ 371 (c)(1),
(2), (4) Date: Apr. 10, 2013

(87) PCT Pub. No.: WO2012/060345
PCT Pub. Date: May 10, 2012

(65) Prior Publication Data
US 2013/0208653 A1    Aug. 15, 2013

(30) Foreign Application Priority Data

Nov. 4, 2010  (JP) .................................. 2010-247753

(51) Int. Cl.
*H04B 7/14*    (2006.01)
*H04W 76/02*    (2009.01)
*H04B 7/155*    (2006.01)
*H04W 84/04*    (2009.01)
*H04W 28/04*    (2009.01)
*H04W 48/20*    (2009.01)

(52) U.S. Cl.
CPC .......... *H04W 76/028* (2013.01); *H04W 84/047* (2013.01); *H04W 28/04* (2013.01); *H04B 7/155* (2013.01); *H04W 48/20* (2013.01); *H04W 76/02* (2013.01)
USPC ........... 370/315; 370/310; 370/328; 370/329; 370/331; 455/436; 455/438

(58) Field of Classification Search
USPC .......... 370/310, 315, 328, 329, 331; 455/436, 455/438
See application file for complete search history.

(56) References Cited

U.S. PATENT DOCUMENTS 5,930,713 A * 7/1999 Nguyen ........................ 455/440
7,664,458 B2 * 2/2010 Ishii et al. ......................... 455/7
(Continued)

FOREIGN PATENT DOCUMENTS

JP    2003188808 A    7/2003
JP    2007053607 A    3/2007
JP    2010239226 A    10/2010

OTHER PUBLICATIONS

Notice of Allowance in corresponding Japanese Patent Application No. 2010-247753 dated Jan. 18, 2012, with translation (2 pages).

(Continued)

*Primary Examiner* — Andrew Lai
*Assistant Examiner* — Andrew C Lee
(74) *Attorney, Agent, or Firm* — Osha Liang LLP

(57) ABSTRACT

A relay node of a communication system includes a communication unit that initiates a session by executing an initial connection procedure for retrieving a cell list indicating one or more donor base station candidates from a maintenance node after establishment of an initial communication link among the relay node, a base station, and a switching center, and for establishing a communication link to a donor base station in the cell list and a switching center connected to the donor base station; a storing unit that stores the cell list; and a reconnection control unit that selects, when a radio link with the donor base station is lost, a donor base station satisfying a predetermined criterion in the cell list, and that causes the communication unit to establish a communication link to the selected donor base station and a switching center connected to the selected donor base station.

7 Claims, 7 Drawing Sheets

(56) References Cited

U.S. PATENT DOCUMENTS

| | | | |
|---|---|---|---|
| 8,254,981 B2 * | 8/2012 | Dwyer et al. .................. | 455/525 |
| 8,358,577 B1 * | 1/2013 | Khanka et al. ................ | 370/221 |
| 8,401,068 B2 * | 3/2013 | Ulupinar et al. .............. | 375/240 |
| 2007/0104126 A1 * | 5/2007 | Calhoun et al. ............... | 370/328 |
| 2008/0207209 A1 * | 8/2008 | Katori et al. .................. | 455/447 |
| 2008/0232296 A1 * | 9/2008 | Shin et al. ..................... | 370/315 |
| 2009/0097433 A1 * | 4/2009 | Shen et al. .................... | 370/315 |
| 2009/0129291 A1 * | 5/2009 | Gupta et al. ................... | 370/254 |
| 2009/0252065 A1 * | 10/2009 | Zhang et al. .................. | 370/256 |
| 2010/0103861 A1 * | 4/2010 | Ulupinar et al. .............. | 370/315 |
| 2010/0172272 A1 * | 7/2010 | Tenny ........................... | 370/280 |
| 2010/0202391 A1 * | 8/2010 | Palanki et al. ................. | 370/329 |
| 2011/0039557 A1 * | 2/2011 | Narasimha et al. ........... | 455/434 |
| 2011/0051655 A1 * | 3/2011 | Blankenship et al. ........ | 370/315 |
| 2011/0053588 A1 * | 3/2011 | Al-Khudairi et al. ......... | 455/424 |
| 2011/0081903 A1 * | 4/2011 | Cai et al. ....................... | 455/424 |
| 2011/0194482 A1 * | 8/2011 | Ji et al. .......................... | 370/315 |
| 2011/0194483 A1 * | 8/2011 | Ji et al. .......................... | 370/315 |
| 2011/0205914 A1 * | 8/2011 | Krishnamurthy et al. .... | 370/252 |
| 2012/0002537 A1 * | 1/2012 | Bao et al. ....................... | 370/221 |
| 2012/0071085 A1 * | 3/2012 | Gunnarsson et al. .......... | 455/7 |

OTHER PUBLICATIONS

International Search Report issued in PCT/JP2011/075119, mailed on Jan. 31, 2012, with translation (7 pages).

Written Opinion issued in PCT/JP2011/075119, mailed on Jan. 31, 2012 (3 pages).

Nokia Siemens Networks, et al., "RLF of RN on Un interface," 3GPP TSG-RAN WG2 Meeting #70, R2-103067; Montreal, Canada; May 10-14, 2010 (Pertinent sections: 2.1 "Handing of the Uu during Un RLF and Un Recovery" and 2.2 "Successful RRC Reestablishment after RLF") (5 pages).

Chinese Office Action for Application No. 201180052456.7, mailed on Feb. 19, 2014 (15 pages).

InterDigitial Communications, "Aspects of Phased RN Startup", 3GPP TSG-RAN WG3 Meeting #69bis R3-102791; Oct. 11-15, 2010; Xian China (2 pages).

\* cited by examiner

RELAY NODE AND RECONNECTION METHOD

TECHNICAL FIELD

The present invention relates to a relay node and a reconnection method.

BACKGROUND ART

In a cellular mobile communication system, a relay node (Relay Node: RN) may be provided between an eNodeB (eNB) and user equipment (UE), in order to expand coverage by a cell and/or to attempt to distribute load to the eNodeB (eNB). In this case, the eNodeB functions as a parent eNodeB, and it is referred to as a "donor eNodeB" (Donor eNodeB: DeNB). Here, the donor eNodeB and an eNodeB other than the donor eNodeB may be referred to as the "eNB," provided that there are no possibilities of confusion. The user equipment (UE) is typically a mobile station. However, the user equipment (UE) may be a fixed station. A radio interface between the eNodeB (eNB) and the relay node (RN) is referred to as "Un." A radio interface between the relay node (RN) and the user equipment (UE) is referred to as "Uu."

When a radio link between a relay node (RN) and a donor eNodeB (DeNB) is lost, the radio link is re-established. Based on the items for which the agreements were made in the standardization of the next generation mobile communication system by the third generation partnership project (3GPP) at the time of filing this application, it is defined that, when a radio link failure (Radio Link Failure: RLF) occurs, the radio link is re-established by performing an initial connection procedure (non-patent document 1 disclosed this point).

RELATED ART DOCUMENT

Non-Patent Document

Non-patent document 1: R2-103067, 3GPP TSG-RAN WG2 Meeting #70, Montreal, Canada, 10-14 May 2010("2.1 Handling of the Uu during Un RLF and Un Recovery," "2.2 Successful RRC Reestablishment after RLF")

SUMMARY OF THE INVENTION

Problem to be Solved by the Invention

In addition to a procedure of the relay node (RN) to setup a communication link between an eNodeB (eNB) and a mobility management entity (MME), the initial connection procedure includes a procedure for establishing a communication link to a donor eNodeB (DeNB) of the relay node (RN) and a communication link to a mobility management entity (RN-MME) which is connected to the donor eNodeB (DeNB), subsequent to turning on a power supply of the user equipment (UE). Accordingly, it is possible that it takes quite a long time from the start of the initial connection procedure to the completion of the initial connection procedure.

An objective of the present invention is to enable quick re-establishment when a radio link is lost.

Means for Solving the Problem

According to one aspect of the present invention, there is provided a relay node. The relay node includes a communication unit that initiates a session of the relay node by executing an initial connection procedure for retrieving a cell list indicating one or more donor base station candidates from a maintenance node connected to the switching center after establishment of an initial communication link among the relay node, a base station, and a switching center, and for establishing a communication link to one of donor base stations included in the cell list and to a switching center connected to the donor base station; a storing unit that stores the cell list; a reconnection control unit that selects, when a radio link with the donor base station is lost, a donor base station satisfying a predetermined criterion from the cell list stored in the storing unit, and that causes the communication unit to establish a communication link to the selected donor base station and to a switching center connected to the selected donor base station.

Effect of the Present Invention

According to a technique in accordance with an embodiment of the present invention, when the radio link between the relay node and the donor base station is lost, a radio link is quickly re-established.

EMBODIMENTS FOR CARRYING OUT THE INVENTION

An embodiment of the present invention is explained from the following perspectives.
1. System
2. Operation example
2.1 Case where a connectable cell is detected in DeNB cell list
2.2 Case where no connectable cells are detected in DeNB cell list
2.3 Operation flow in relay node
3. Relay node
4. Modified example
4.1 First modified example
4.2 Second modified example
4.3 Third modified example

First Embodiment

1. System

Figure 1:
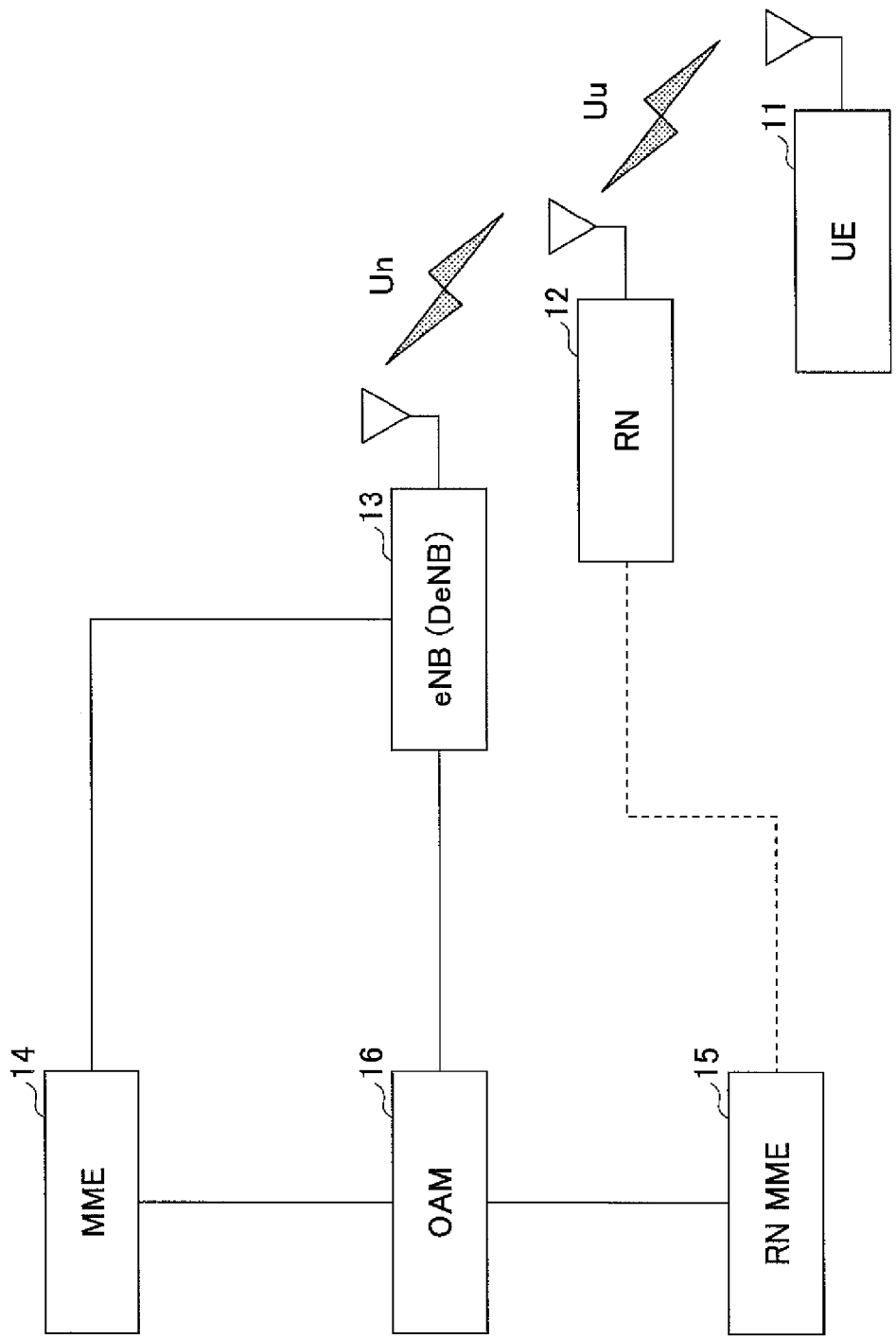
FIG. 1 is a schematic configuration diagram of a communication system according to an embodiment.

FIG. 1 shows an outline of a communication system according to the embodiment of the present invention. FIG. 1 shows user equipment (UE) 11; a relay node (RN) 12; a donor eNodeB (DeNB) 13; a mobility management entity (MME) 14; a mobility management entity (RN-MME) 15; and an operations and maintenance node (OAM) 16. As described above, the radio interface between the user equipment (UE) 11 and the relay node (RN) 12 is referred to as "Uu." The radio interface between the relay node (RN) 12 and the eNodeB (eNB) 13 is referred to as "Un."

The user equipment (User Equipment: UE) 11 may be any suitable devices that can be used by the user for radio communications. Specifically, the user equipment (UE) may be a mobile phone, an information terminal, a smart phone, a personal digital assistant, a mobile personal computer, or the like. However, the UE is not limited to these.

The relay node (Relay Node: RN) 12 relays communication between the user equipment (UE) 11 and the donor eNodeB (DeNB) 13. The relay node (RN) 12 communicates with the user equipment (UE) 11 through the radio link (Uu). Additionally, the relay node (RN) 12 communicates with the donor eNodeB (DeNB) 13 through the radio link (Un).

In addition to relaying the communication between the user equipment (UE) in a cell and the mobility management entity (MME) 14, the donor eNodeB (Donor E-UTRAN Node B: DeNB) 13 manages radio resources. The user equipment (UE) 11 may be indirectly connected to the donor base station (DeNB) 13 through the relay node (RN) 12. Alternatively, the user equipment (UE) 11 may be directly connected to the donor eNodeB (DeNB) 13, not through the relay node (RN) 12. The donor eNodeB (DeNB) can communicate with the relay node (RN) through the radio link (Un). Further, the donor eNodeB (DeNB) 13 is also connected to the mobility management entity (MME) 14 and to the operations and maintenance node (CAM) 16, typically through a wired communication path.

The mobility management entity (Mobility Management Entity: MME) 14 and the mobility management entity (RN-MME) 15 perform processes of a core network for communication for a user which is performed through the donor eNodeB (DeNB) 13. For example, the mobility management entity performs subscriber information management, mobility management, call origination/termination control, billing control, and QoS control.

The operations and maintenance node (Operation, Administration, and Maintenance: OAM) 16 manages an operating state of the communication network. For example, the operations and maintenance node (OAM) 16 manages information regarding which node a failure occurs. The operations and maintenance node (OAM) 16 is connected to the mobility management entities (MME, RN-MME) 14 and 15, typically through wired communication paths.

The dashed line between the relay node (RN) 12 and the mobility management entity (RN-MME) 15 merely indicates that there is a logical path. The dashed line does not indicate a physical communication path. Namely, the communication between the relay node (RN) 12 and the mobility management entity (RN-MME) 15 is performed through the donor eNodeB (DeNB) 13 and the operations and maintenance node (OAM) 16, for example. The solid lines among other nodes indicate physical communication paths (typically a wired link).

2. Operation Example

Hereinafter, an operation example according to the embodiment is explained.

Figure 2:
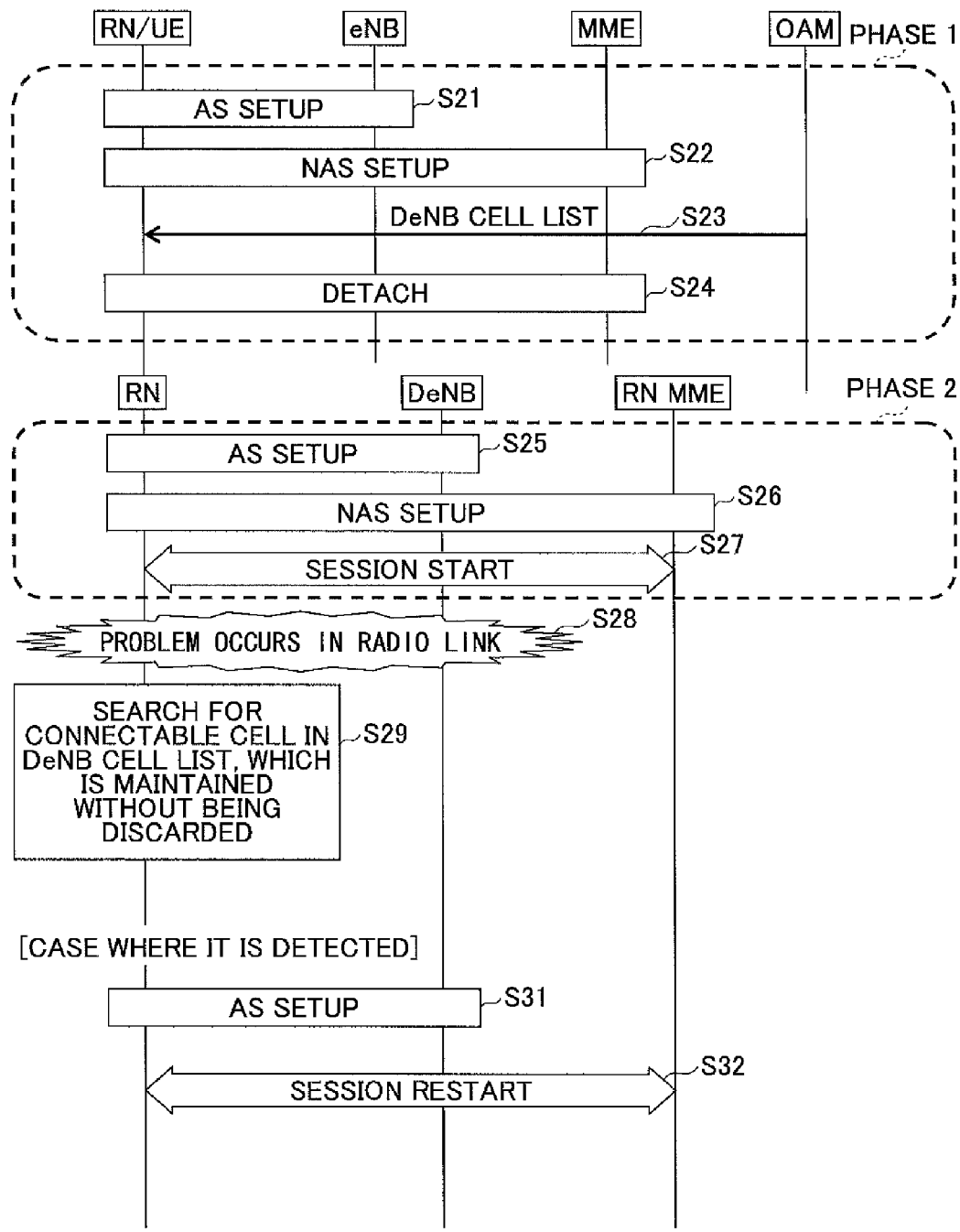
FIG. 2 is an operation sequence performed among a relay node, eNodeBs, MMEs, and an operations and maintenance node (a detected case)
Figure 3:
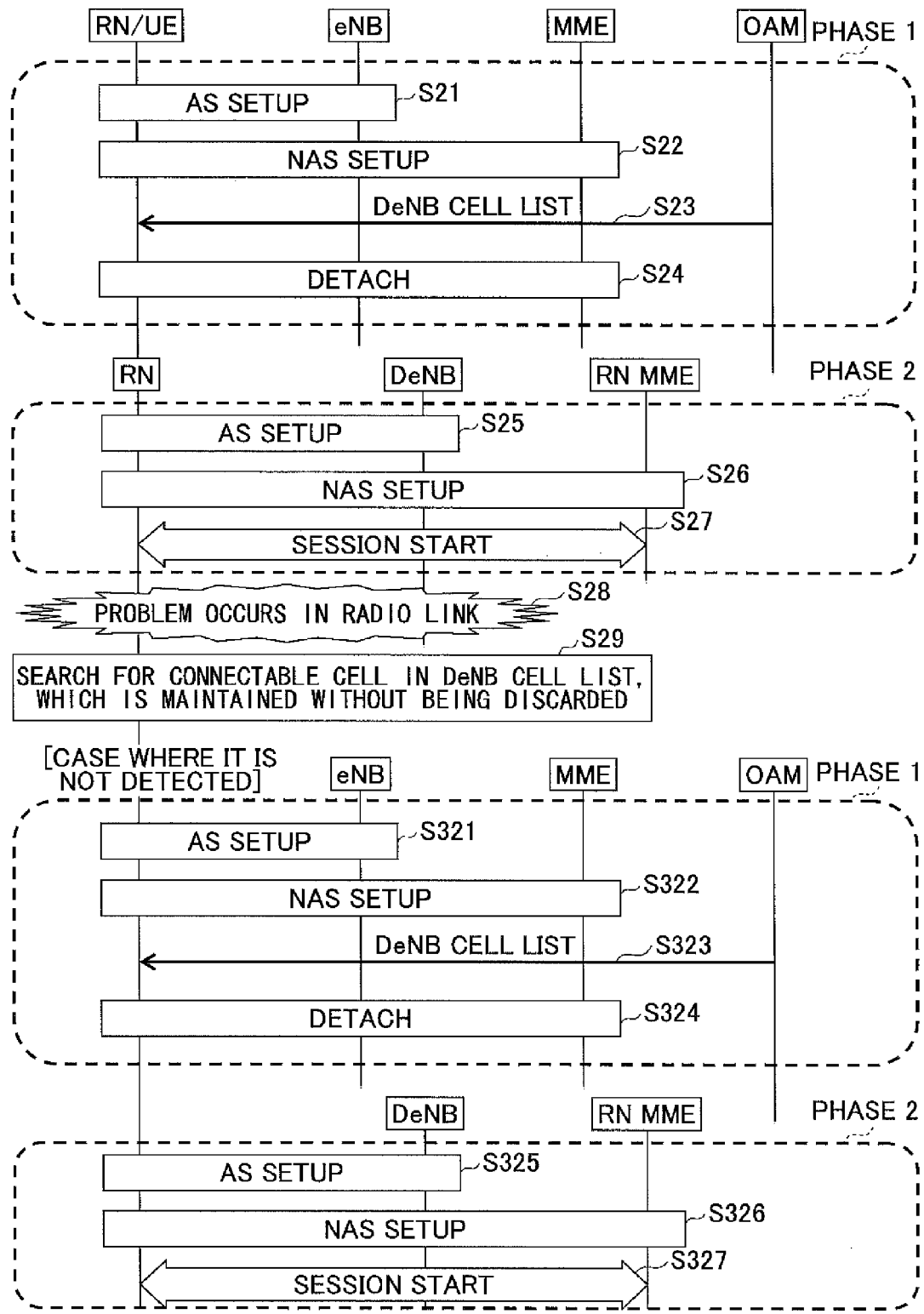
FIG. 3 is an operation sequence performed among the relay node, the eNodeBs, the MMEs, and the operations and maintenance node (a non-detected case)

FIGS. 2 and 3 show sequences performed among the user equipment (UE), the eNodeBs (eNB, DeNB), the mobility management entities (MME, RN-MME), and the operations and maintenance node (OAM). An outline of operations is explained. Here, the operations are from establishment of a communication link after the power supply of the relay node (RN) is turned on (or reset) until re-establishment of a communication link. When the relay node (RN) establishes the communication link after the power supply is turned on or the power supply is reset, first a communication link is established (phase 1), similar to the user equipment (UE). Subsequently, a communication link is established (phase 2) which is for functioning as a relay node (RN).

At step S21, the relay node (RN) first establishes a radio link with the eNodeB (eNB), as user equipment (UE). Here, "AS SETUP" indicates that this process is a process regarding an access stratum (access stratum: AS).

At step S22, a communication link between the eNodeB (eNB) and the mobility management entity (MME) is established. Here, "NAS SETUP" indicates that this process is a process regarding a non-access stratum (non access stratum: NAS). For example, by this process, location registration, authentication processing, setting of a subscriber profile, and mobility management are performed. By doing this, the relay node (RN) becomes able to communicate with the eNodeB (eNB) and the mobility management entity (MME) as the user equipment (UE), and thereby the attach procedure is completed.

At step S23, the relay node (RN) retrieves a DeNB cell list from the operations and maintenance node (OAM). The DeNB cell list is a list of eNodeBs that can function as donor eNodeBs (DeNB), among various eNodeBs (eNBs). Namely, the DeNB cell list indicates one or more donor eNodeBs (DeNBs).

At step S24, the relay node (RN) releases the communication link between the eNodeB (eNB) and the mobility management entity (MME). Namely, the relay node (RN) performs the detach procedure. By doing this, the process of the phase 1 is completed, and the process continues to the process of the phase 2.

The relay node (RN) performs a cell search while measuring a reception level of the serving cell and reception levels of neighboring cells, and thereby identifying some eNodeBs, which provide sufficient reception levels for the relay node (RN) to be connected to. For convenience, the thus identified eNodeB is referred to as the "eNB-x." When the DeNB cell list includes the "eNB-x," the "eNB-x" becomes the donor eNodeB (DeNB) of the relay node (RN). For a case where there are several candidates of the eNodeB, which provide suitable reception levels and which are included in the DeNB cell list, one of the candidates may be selected as the donor cell list in accordance with some determination basis. For example, an eNodeB may be selected which provides the best reception level. Alternatively, an eNodeB may be selected in accordance with a priority, which is defined in advance in each of the eNodeBs. Additionally, one eNodeB may be randomly selected among the plural candidates of the eNodeB. When no eNodeBs are found, which provide suitable reception levels and which are included in the DeNB cell list, it may not function as a relay node.

Here, the reception level in the embodiment is broadly defined to be an amount representing whether a condition of a radio link is good, regardless of whether it is an instantaneous value or an average value. The reception level may be expressed in terms of the received power, the electric field strength RSSI, the desired wave received power RSCP, the path loss, the SNR, the SIR, the $Ec/N_0$, and the CQI, for example. However, the reception level is not limited to these.

At step S25 of the phase 2, a radio link is established with respect to the "eNB-x," which is identified as the donor eNodeB. Similar to the case of step S21, this procedure is a process regarding the access stratum (AS).

At step S26, a communication link between the donor eNodeB (DeNB) and the mobility management entity (RN-MME) is established. Similar to the case of step S22, this procedure is a process regarding the non-access stratum (NAS). The donor eNodeB (DeNB) specifies which mobility management entity is the "RN-MME." By doing this, the relay node (RN) becomes able to communicate with the donor eNodeB (DeNB) and a session of the relay node is started (step S27). Here, the eNodeB (eNB) to which the relay node (RN) is connected in the phase 1 and the donor eNodeB (DeNB) to which the relay node (RN) is connected in the phase 2 may be the same or different. Similarly, the mobility management entity (MME) to which the relay node (RN) is connected in the phase 1 and the mobility management entity (RN-MME) to which the relay node (RN) is connected in the phase 2 may be the same or different.

Suppose that the radio link is lost at step S28. The cause may be a radio link failure (RLF), a handover failure, or an RRC Configuration failure. However, the cause is not limited to these.

At step S29, the relay node (RN) maintains the DeNB cell list retrieved at step S23 without discarding it, and the relay node (RN) searches in the DeNB cell list for a connectable eNodeB. For a case where there are several candidates of the eNodeB, which provide suitable reception levels and which correspond to the DeNB cell list, any one of the eNodeBs may be selected as the donor eNodeB in accordance with a determination basis, such as the above-described bases. A case is considered in which a connectable eNodeB is found in the DeNB cell list, and another case is considered in which no connectable eNodeBs are found in the DeNB cell list. Operations of the corresponding cases are explained hereinafter.

2.1 Case where a Connectable Cell is Detected in DeNB Cell List, and a Reconnection Request to the Cell is Accepted When a connectable cell (eNodeB) is found in the DeNB cell list at step S29 and a reconnection request to the cell is accepted, the relay node (RN) establishes a radio link with the detected eNodeB at step S31. Similar to the case of step S21, this procedure is a process regarding the access stratum (AS). Usually, the eNodeB which is detected at step S29 is the donor eNodeB (DeNB), with which the session was performed immediately prior to losing the radio link. The communication link between the donor eNodeB (DeNB) and the mobility management entity (RN-MME) has already been set at step S26. Accordingly, the session of the relay node (RN) can be quickly re-started (step S32), provided that the radio link between the relay node (RN) and the donor eNodeB (DeNB) can be re-established.

2.2 Case where No Connectable Cells are Detected in DeNB Cell List or a Reconnection Request to a Connectable Cell is Rejected Operations are explained for a case where no connectable cells (eNodeBs) are detected in the DeNB cell list or a case where a reconnection request to a connectable cell is rejected, while referring to FIG. 3. Since the processes of steps S21-S29 in FIG. 3 are the same as the processes of the same numbers in FIG. 2, overlapped explanations are omitted.

When no connectable cells (eNodeBs) are found in the DeNB cell list, an initial connection procedure of steps S21-S27 (phases 1 and 2) is performed. In this case, the DeNB cell list is discarded. It can be determined by any suitable basis that no connectable cells (eNodeBs) are found. For example, after the start of the cell search at step S29, when a predetermined timer is expired while no connectable cells are found, determination may be made that no connectable cells are found.

At step S321, a mode of the relay node (RN) is switched again to an UE mode where the relay node (RN) operates as the user equipment (UE), thereby a radio link with the eNodeB (eNB) is established.

At step S322, a communication link between the eNodeB (eNB) and the mobility management entity (MME) is established. By doing this, the relay node (RN) becomes able to communicate with the eNodeB (eNB) and the mobility management entity (MME) as the user equipment (UE), and thereby completing the attach procedure.

At step S323, the relay node (RN) retrieves the DeNB cell list from the operations and maintenance node (OAM). The DeNB cell list is typically the same as that of the retrieved cell list at step S23. However, the DeNB cell list may be different from that of the retrieved cell list at step S23. For example, when a region is different, a different DeNB cell list is provided. Alternatively, from a perspective of load distribution or a perspective of avoiding congestion, the candidates of the donor eNodeB (DeNB) may be changed.

At step S324, the relay node (RN) releases the communication link between the base station (eNB) and the mobility management entity (MME), namely, the relay node (RN) performs the detach procedure. By doing this, the process of the phase 1 is completed, and the process continues to the process of the phase 2.

The relay node (RN) performs a cell search while measuring a reception level of the serving cell and reception levels of neighboring cells, and thereby the relay node (RN) identifies which eNodeB is providing a reception level which is sufficient to be connected by the relay node (RN). When the thus identified eNodeB is included in the DeNB cell list, the eNodeB becomes the donor eNodeB (DeNB) of the relay node (RN).

At step S325, a radio link to the eNodeB is established, which is identified as the donor eNodeB.

At step S326, a communication link between the donor eNodeB (DeNB) and the mobility management entity (RN-MME) is established. By doing this, communications with the donor eNodeB (DeNB) and the mobility management entity (RN-MME) are enabled as the relay node (RN), and a session of the relay node is started (step S327).

2.3 Operation Flow in Relay Node

Figure 4:
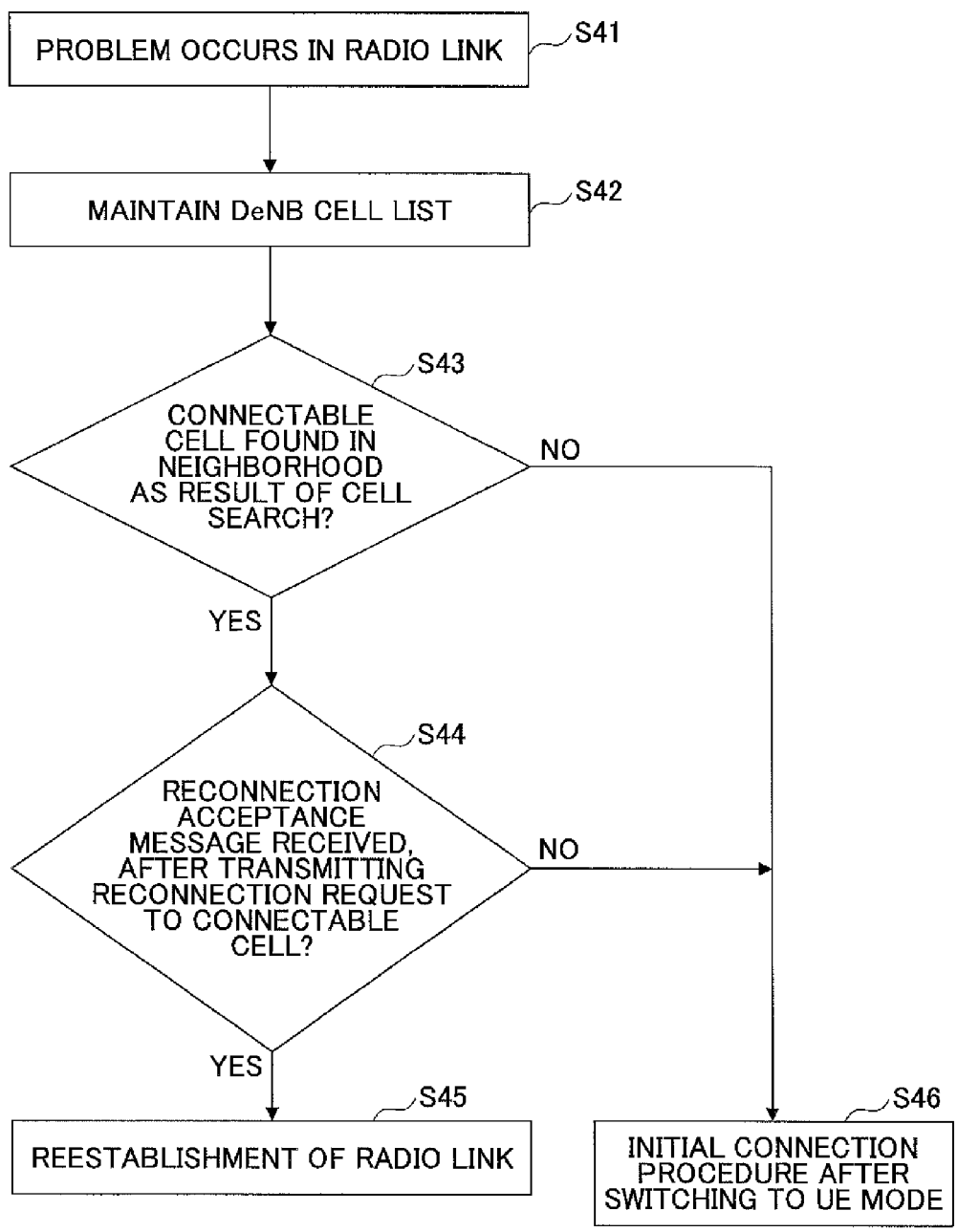
FIG. 4 is a flowchart showing an example of operations of the relay node.

FIG. 4 is a flowchart showing an example of operations of the relay node (RN). Hereinafter, the operations which are explained by referring to FIGS. 2 and 3 are explained from a perspective of the relay node (RN).

At step S41, the relay node (RN) detects that a problem occurs in the radio link. This step corresponds to step S28 of FIGS. 2 and 3.

At step S42, the relay node (RN) maintains the DeNB cell list without discarding it, even if the radio link is lost. Here, step S42 is shown after step S41. Note that this does not indicate a temporal order. The DeNB cell list is obtained at the initial connection procedure, and subsequently the relay node keeps holding it. Step S42 emphasizes that the DeNB cell list is maintained without being discarded.

Subsequent to losing the radio link, the relay node (RN) performs a cell search and searches for a connectable cell at step S43. When a connectable cell is found, the flow proceeds to step S44.

At step S44, the relay node (RN) transmits a reconnection request to an eNodeB of the detected cell. When the reconnection request is accepted, the relay node (RN) receives a reconnection acceptance message from the detected cell. Subsequently, the flow proceeds to step S45. These steps correspond to step S29 of FIGS. 2 and 3.

At step S45, the relay node (RN) establishes a radio link with the eNodeB, to which the reconnection request is made. This step corresponds to step S31 of FIG. 2. Usually, the detected eNodeB is the donor eNodeB, with which the session was performed immediately prior to losing the radio link. The communication link between the donor eNodeB and the mobility management entity has already been established in the initial connection procedure. Accordingly, the session of the relay node (RN) can be quickly restarted, provided that the radio link between the relay node (RN) and the donor eNodeB (DeNB) is re-established.

When no connectable cells are detected at step S43, when a reconnection reject message for rejecting the reconnection request is received at step S44, or when a predetermined timer is expired without receiving the reconnection acceptance message, the relay node (RN) discards the maintained DeNB cell list. The mode of the relay node (RN) switches to the UE mode where the relay node (RN) operates as the user equipment (UE). The relay node (RN) establishes a communication link (step S46) by performing the initial connection procedure (steps S321-S327 of FIG. 3).

3. Relay Node

Figure 5:
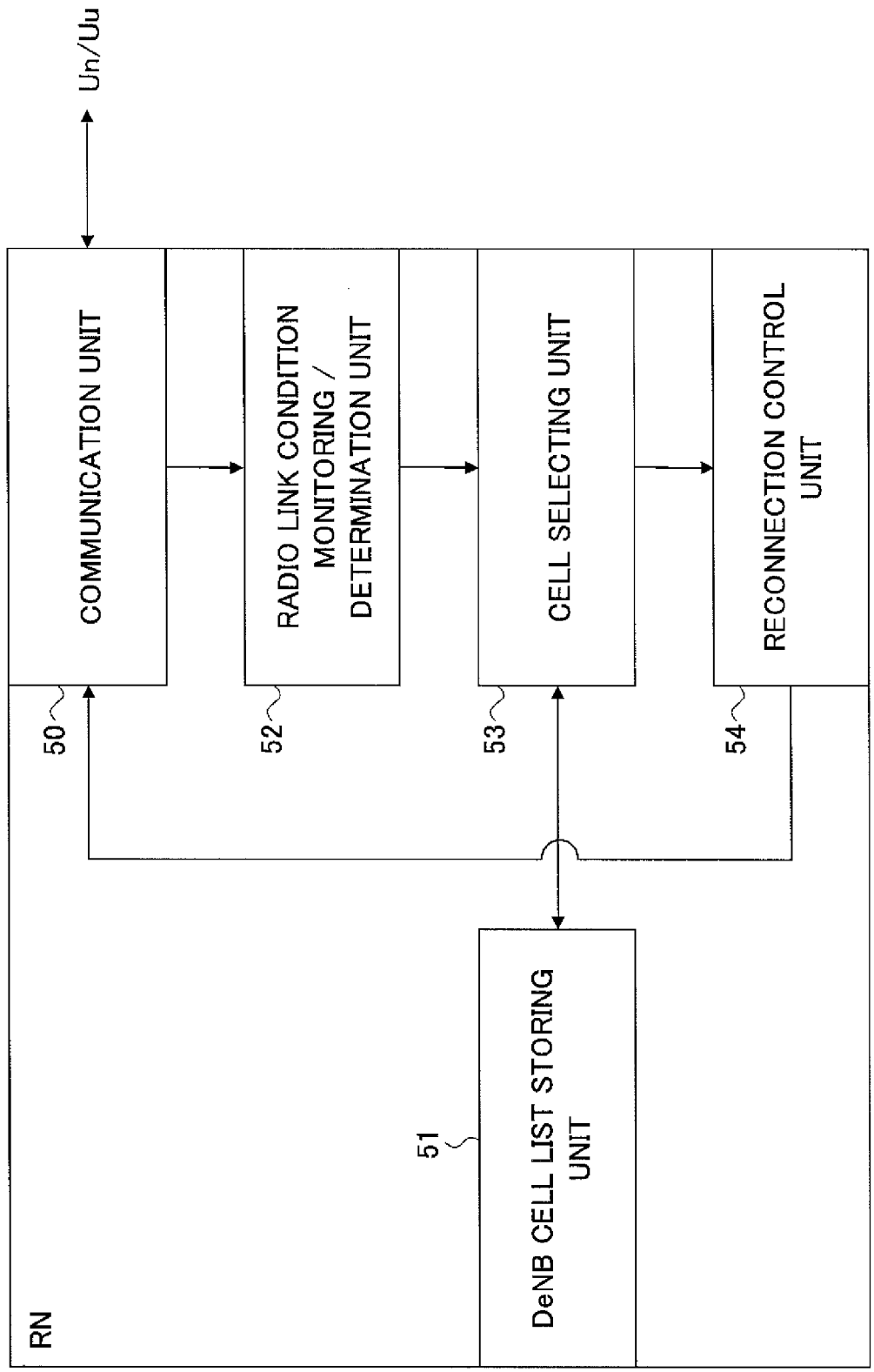
FIG. 5 is a schematic block diagram of the relay node.

FIG. 5 shows a schematic block diagram of the relay node (RN). Among various functional elements included in the relay node (RN), the elements which are particularly related to the embodiment are shown in the figure. The relay node (RN) includes at least a communication unit 50; a DeNB cell list storing unit 51; a radio link condition monitoring/determination unit 52; a cell selecting unit 53; and a reconnection control unit 54.

The communication unit 50 performs radio communication with the donor eNodeB (DeNB) through a radio interface represented by "Un." In addition, the communication unit 50 performs radio communication with the user equipment (UE) through a radio interface represented by "Uu." In the initial connection procedure, the communication unit 50 retrieves the DeNB cell list from the operations and maintenance node (OAM) connected to the mobility management entity (MME), after the communication links among the relay node (RN), the eNodeB (eNB), and the mobility management entity (MME) are established. Subsequently, the communication unit 50 selects any one of the eNodeBs in the DeNB cell list as the donor eNodeB (DeNB), and thereby the communication unit 50 establishes a communication link to the mobility management entity (RN-MME), which is connected to the donor eNodeB (DeNB) and the relay node (RN) through logical paths. By doing this, the initial connection procedure is completed.

The DeNB cell list storing unit 51 maintains the DeNB cell list. The DeNB cell list is maintained without being quickly discarded, even if the radio link is lost. The DeNB is discarded, for example, for a case where the initial connection procedure is started once again. The DeNB cell list is a list of eNodeBs that can function as the donor eNodeB (DeNB) among various eNodeBs (eNBs). Namely, the DeNB cell list shows one or more candidates of the donor eNodeB.

The radio link condition monitoring/determination unit 52 monitors a condition of a radio link. When the condition is degraded, the radio link condition monitoring/determination unit 52 determines whether the radio link is to be reestablished. The radio link condition monitoring/determination unit 52 determines whether the radio link is to be reestablished by measuring a reception level of a radio wave (specifically, a pilot signal) received from a donor eNodeB (DeNB). Additionally, the radio link condition monitoring/determination unit 52 measures reception levels of radio waves coming from eNodeBs, which exist around the relay node (RN).

The cell selecting unit 53 performs a cell search, and selects an eNodeB which is suitable to be connected to.

When a radio link with the donor eNodeB (DeNB) is lost, the reconnection control unit 54 causes the communication unit 50 to reestablish the communication link by a simple reconnection procedure or by the time-consuming initial connection procedure. When the radio link is lost, the reconnection control unit 54 searches in the maintained DeNB cell list for an eNodeB, which satisfies a predetermined criterion. Specifically, among the eNodeBs listed in the DeNB cell list, an eNodeB which provides a reception level of greater than or equal to a predetermined value is selected as the donor eNodeB (DeNB). For a case where such an eNodeB is selected, the reconnection control unit 54 causes the communication unit 50 to establish a communication link to the selected donor eNodeB (DeNB) and a communication link to the mobility management entity (RN-MME) connected to the donor eNodeB (DeNB). For a case where no eNodeBs are found, which provide reception levels of greater than or equal to the predetermined value, among the eNodeBs listed in the DeNB cell list, the reconnection control unit 54 causes the communication unit 50 to execute the initial connection procedure once again.

4. Modified Example

4.1 First Modified Example

As referred to in the background art, according to the agreed items regarding the 3GPP standard specifications for the next generation mobile communication system at the time of filing this application, when a radio link failure (RLF) occurs, the relay node (RN) reestablishes the communication link by performing the initial connection procedure. From a perspective of performing the operations according to the embodiment while performing this operation, it can be considered that the initial connection procedure is performed when the cause of losing the radio link is the RLF, and that the above-described operations according to the embodiment are performed when the radio link is lost because of a cause other than the RLF.

Figure 6:
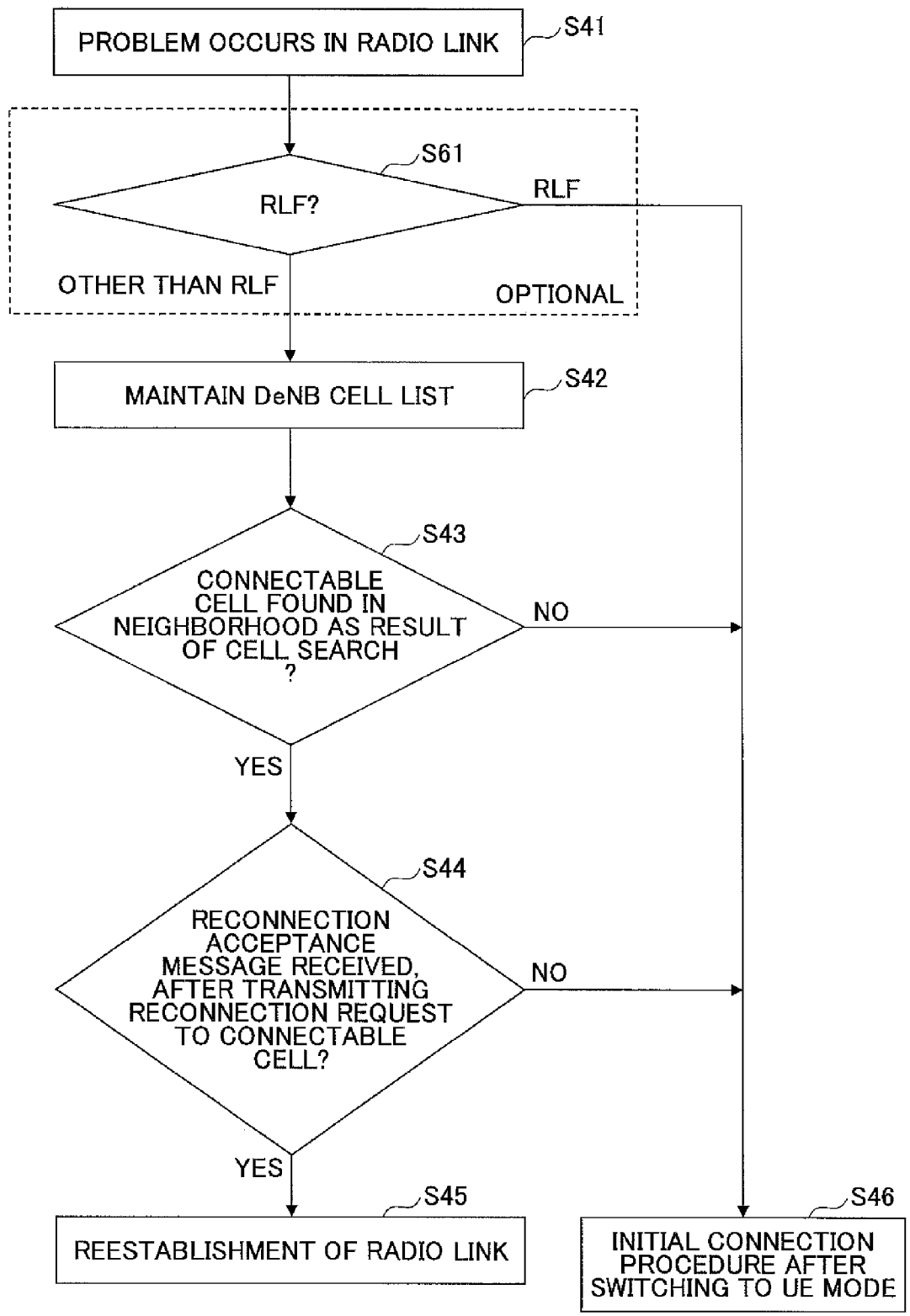
FIG. 6 is a flowchart showing an example of operations according to a first modified example.

FIG. 6 shows an operation flow which is modified from such a perspective. In general, the operation flow is the same as the operation flow shown in FIG. 4. However, the operation flow is different in a point that case analysis is performed at step S61 after step S41. The same reference numerals are attached to the procedures which are already explained in FIG. 4. Duplicated explanations for these procedures are omitted.

When the radio link is lost at step S41, the relay node (RN) determines at step S61 whether the cause is attributable to the radio link failure (RLF). As a cause of losing the radio link, the radio link failure (RLF), a handover failure, and an RRC Configuration failure may be considered (however, the cause is not limited to these). It can be determined by the most recent reception level as to whether or not the cause is attributable to the RLF. It can be determined by determining whether the failure occurs during performing a handover as to whether or not the cause is attributable to the handover. It can be determined by comparing a setting value of the RRC configuration of the eNodeB and a setting value of the RRC configuration of the relay node as to whether or not the cause is attributable to the RRC configuration. For determining as to whether the failure is caused by a handover, and for determining as to whether the failure is caused by an RRC configuration, a condition of the most recent reception level may be considered.

When the radio link is lost due to the RLF, the flow proceeds to step S46. At step S46, the relay node (RN) establishes communication links among the relay node (RN), the donor eNodeB (DeNB), and mobility management entity (RN-MME). In this manner, the agreed items regarding the 3GPP standard specifications can be complied with. Whereas, when the radio link is lost due to a cause other than the RLF, the flow proceeds to step S42, and subsequently the explained processes are performed.

4.2 Second Modified Example

Technically, the relay node (RN) and the eNodeBs (eNB and DeNB) may be fixed stations or mobile stations. Typically, the relay node (RN) and the eNodeBs (eNB and DeNB) are fixed stations. Thus, a geographical location relationship among the relay node (RN) and the eNodeBs (eNB and DeNB) and a radio propagation condition among them do not change rapidly. Accordingly, it is expected that the likelihood of changing the donor eNodeB (DeNB) after the radio link is lost and until the radio link is reestablished be significantly low. Here, the donor eNodeB (DeNB) is the eNodeB to which the relay node (RN) is to be connected. Namely, subsequent to losing the radio link, it is highly likely that the eNodeB to which the relay node (RN) is to be connected is the donor eNodeB (DeNB), with which the session was performed immediately prior to losing the radio link.

Figure 7:
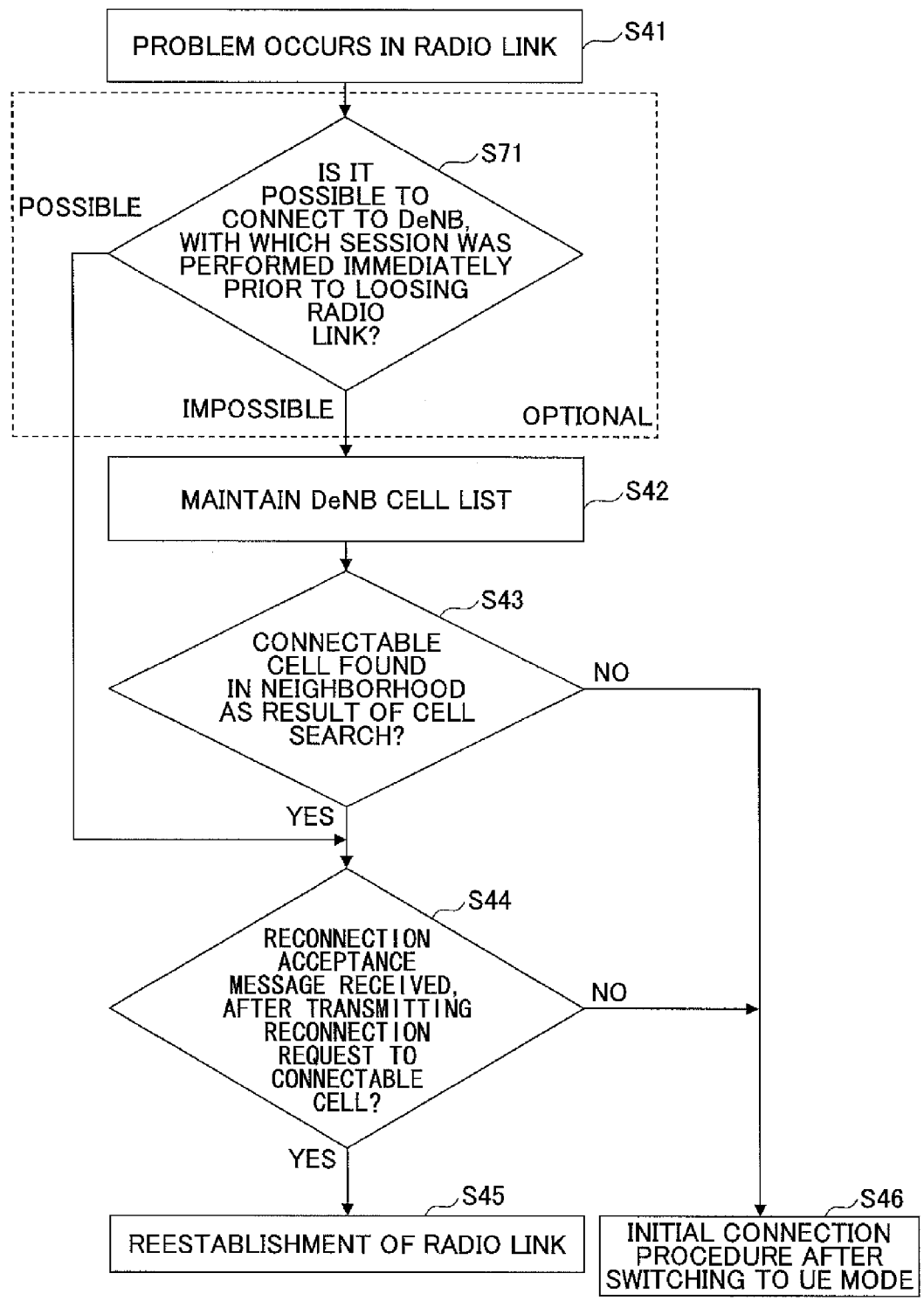
FIG. 7 is a flowchart showing an example of operations according to a second modified example.

FIG. 7 shows an operation flow, which is modified from such a perspective. In general the operation flow is the same as the operation flow shown in FIG. 4. However, the operation flow is different in a point that a process of step S71 is performed after step S41. The same reference numerals are attached to the procedures which are already explained in FIG. 4. Duplicated explanations for these procedures are omitted.

When the radio link is lost at step S41, the relay node (RN) determines whether it is possible to connect to the donor eNodeB (DeNB), with which the session was performed immediately prior to losing the radio link. It can be determined by determining whether the reception level from the donor eNodeB (DeNB) is greater than or equal to predetermined quality as to whether or not it is possible to connect to the donor eNodeB (DeNB). When it is possible to connected to the donor eNodeB (DeNB), with which the session was performed immediately prior to losing the radio link, the operation flow proceeds to step S44, and the explained processes are performed.

When it is not confirmed that it is possible to connected to the donor eNodeB (DeNB), with which the session was performed immediately prior to losing the radio link, the operation flow proceeds to step S42, and subsequently the explained processes are performed.

4.3 Third Modified Example

The above described first modified example and the second modified example can be combined. In such a case, the process at step S71 of FIG. 7 may be performed after step S41 of FIG. 4, and subsequently the process at step S61 of FIG. 6 may be performed. Alternatively, the process at step S61 of FIG. 6 may be performed after step S41 of FIG. 4, and subsequently the process at step S71 of FIG. 7 may be performed.

Hereinabove, the present invention is explained by referring to the specific embodiments. However, the embodiments are merely illustrative, and variations, modifications, alterations and substitutions could be conceived by those skilled in the art. For example, the present invention may be applied to any suitable mobile communication system which reestablishes a radio link of a relay node (RN). For example, the present invention may be applied to a W-CDMA system, an HSDPA/HSUPA based W-CDMA system, an LTE system, an LTE-Advanced system, an IMT-Advanced system, a WiMAX system, and a Wi-Fi system. Specific examples of numerical values are used in order to facilitate understanding of the invention. However, these numerical values are simply illustrative, and any other appropriate values may be used, except as indicated otherwise. The separations of the embodiments or the items are not essential to the present invention. Depending on necessity, subject matter described in two or more items may be combined and used, and subject matter described in an item may be applied to subject matter described in another item (provided that they do not contradict). For the convenience of explanation, the devices according to the embodiments of the present invention are explained by using functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like. The present invention is not limited to the above-described embodiments, and various variations, modifications, alterations, substitutions and so on are included, without departing from the spirit of the present invention.

The present international application claims priority based on Japanese Patent Application No. 2010-247753, filed on Nov. 4, 2010, the entire contents of Japanese Patent Application No. 2010-247753 are hereby incorporated by reference.

LIST OF REFERENCE SYMBOLS

11: User equipment (UE)
12: Relay node (RN)
13: Donor eNodeB (DeNB)
14: Mobility management entity (MME)
15: Mobility management entity (RN-MME)
16: Operations and maintenance node (OAM)
50: Communication unit
51: DeNB cell list storing unit
52: Radio link condition monitoring/determination unit
53: Cell selecting unit
54: Reconnection control unit

The invention claimed is:
1. A relay node of a communication system comprising:
a communication unit that initiates a session of the relay node by executing an initial connection procedure for retrieving a cell list indicating one or more donor base station candidates through a base station after establishment of an initial communication link among the relay node, the base station, and a switching center, and for establishing a communication link to a donor base station of the one or more donor base station candidates included in the cell list and to a switching center connected to the donor base station;

a storing unit that stores the cell list; and a reconnection control unit that selects, when a radio link with the donor base station is lost, a donor base station satisfying a predetermined criterion in the cell list stored in the storing unit, and that causes the communication unit to establish a communication link to the selected donor base station and to a switching center connected to the selected donor base station.

2. The relay node according to claim 1,
wherein, when a cause of losing the radio link with the donor base station is a failure other than a radio link failure (RLF), the reconnection control unit selects the donor base station satisfying the predetermined criterion in the cell list, and the reconnection control unit causes the communication unit to establish the communication link to the selected donor base station and to the switching center connected to the selected donor base station.

3. The relay node according to claim 1,
wherein, when the cause of losing the radio link with the donor base station is the radio link failure (RLF), the reconnection control unit causes the communication unit to perform the initial connection procedure again.

4. The relay node according to claim 3,
wherein, when the reconnection control unit fails to find the donor base station satisfying the predetermined criterion in the cell list, the reconnection control unit causes the communication unit to perform the initial connection procedure again.

5. The relay node according to claim 3,
wherein, when the reconnection control unit fails to confirm acceptance of a reconnection request to the donor base station satisfying the predetermined criterion in the cell list within a time period until expiration of a predetermined timer, the reconnection control unit causes the communication unit to perform the initial connection procedure again.

6. The relay node according to claim 1,
wherein, when there are plural donor base station candidates satisfying the predetermined criterion, the reconnection control unit selects a candidate of which a reception level is relatively good.

7. A reconnection method used in a relay node of a mobile communication system, the reconnection method comprising:

a step of initiating a session of the relay node by executing an initial connection procedure for retrieving a cell list indicating one or more donor base station candidates through a base station after establishment of an initial communication link among the relay node, the base station, and a switching center, and for establishing a communication link to a donor base station of the one or more donor base station candidates in the cell list and to a switching center connected to the donor base station; and a step of selecting, when a radio link with the donor base station is lost, a donor base station satisfying a predetermined criterion in the cell list stored in a storing unit, and establishing a communication link to the selected donor base station and to a switching center connected to the selected donor base station.

\* \* \* \* \*